May 18, 1937. O. F. NELSON 2,080,853
OPHTHALMIC MOUNTING
Filed March 30, 1934
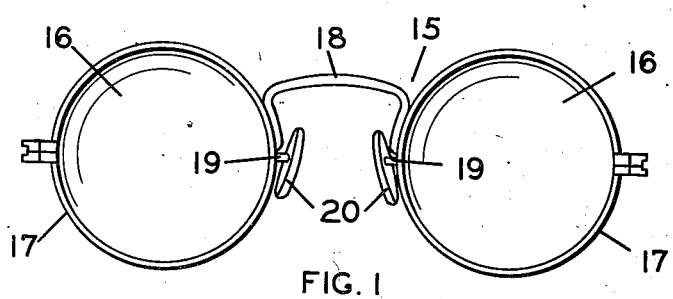
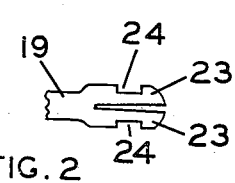
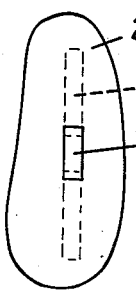
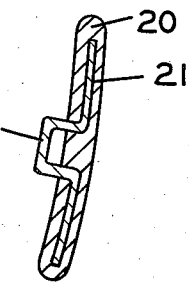
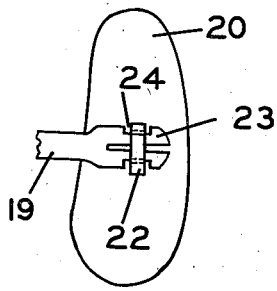
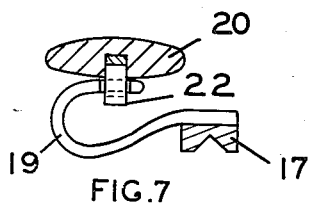
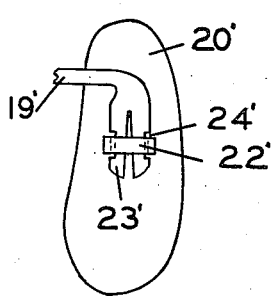
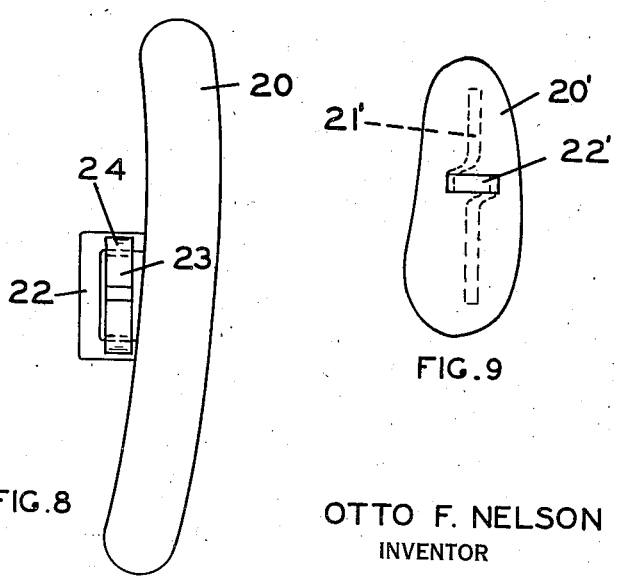
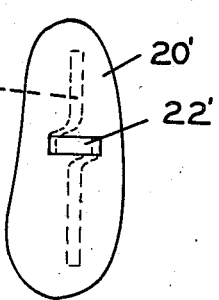
OTTO F. NELSON
INVENTOR
BY *J. A. Ellestad*
ATTORNEY Patented May 18, 1937

2,080,853

UNITED STATES PATENT OFFICE 2,080,853

OPHTHALMIC MOUNTING

Otto F. Nelson, La Crosse, Wis., assignor to Bausch & Lomb Optical Company, Rochester, N. Y., a corporation of New York Application March 30, 1934, Serial No. 718,237

3 Claims. (Cl. 88—49)

This invention relates to ophthalmic mountings and more particularly it has reference to means for rockably mounting a nose pad on its supporting arm.

One of the objects of my invention is to provide an improved nose pad and means for rockably supporting same on an arm. Another object is to provide a movably mounted nose pad and supporting arm which will be relatively simple in structure yet efficient in operation. A further object is to provide a nose pad which can be readily attached to or removed from its supporting arm. These and other objects and advantages reside in certain novel features of construction, arrangement and combination of parts as will hereinafter be more fully described and pointed out in the appended claims.

Referring to the drawing:

Fig. 1 is a view of a spectacle frame embodying my invention.

Fig. 2 is an enlarged fragmentary view of the supporting arm.

Fig. 3 is a side view of same.

Fig. 4 is a rear face view of the nose pad.

Fig. 5 is a vertical section thereof.

Fig. 6 shows the nose pad mounted on the arm.

Fig. 7 is a horizontal sectional view of the nose pad.

Fig. 8 is an enlarged edge view of the nose pad and arm.

Fig. 9 is a modified type of nose pad.

Fig. 10 shows the manner of mounting the modified pad.

A preferred embodiment of my invention is shown in the drawing wherein 15 indicates a spectacle frame comprising the two lenses 16 mounted in rims 17 which are connected by bridge 18. Projecting rearwardly from each rim 17 is an arm 19 on which the nose pad 20 is supported. The nose pad 20 may be formed of any suitable material such as zylonite or any other plastic or similar material which may be molded or cemented. The pad 20 may be formed of a single integral piece by a molding process or it may be built up by cementing two pieces of the material together. In either case, the pad 20 carries an embedded metallic insert 21 having a substantially rectangular loop portion 22 which projects rearwardly from the face of the pad.

The free end of arm 19 is bifurcated as shown in Fig. 2 to provide the two spaced fingers 23 each of which has a notch or re-entrant portion 24 on its outer edge. The pad is mounted on the arm by pressing together the two fingers 23 and inserting within loop 22 so that the inner sides of loop 22 are positioned in the notches 24. The two fingers 23 are resilient so that after insertion in loop 22 they spring apart and thus retain the pad on the arm 19. In this manner the pad is securely held on arm 19 but is adapted to rock in vertical and horizontal planes so as to conform to the nose of the wearer. The amount of movement can be varied by changing the dimensions of the notches. The pad can, of course, be readily detached from or attached to the arm in case of repair or replacement. The connecting parts are sturdily constructed and ample bearing surfaces are provided.

A modified type of pad 20', illustrated in Figs. 9 and 10, has an insert 21' provided with a horizontally positioned loop 22'. This pad is mounted on the vertically positioned part of arm 19' with the fingers 23' positioned within loop 22' and with the sides of loop 22' positioned in the notches 24'.

Various modifications can obviously be made without departing from the spirit of my invention.

I claim:

1. An ophthalmic mounting comprising lens holding means, an arm secured to said means, the free end of said arm being split to form two spaced portions each of which is provided with a re-entrant portion, a nose engaging member having a loop projecting from its surface, said member being mounted on the arm with the loop encircling the said free end of the arm and with the sides of the loop loosely positioned within the re-entrant portions of the arm.

2. In an ophthalmic mounting the combination of lens holding means, an arm secured to said means, said arm having spaced resilient fingers each provided with a notch, a nose engaging member movably mounted on said arm and means for retaining said member on said arm comprising a loop projecting rearwardly from said member with the notches on said resilient fingers loosely engaging the inner side walls of said loop.

3. An ophthalmic mounting comprising lens holding means, an arm secured to said means, said arm having a substantially vertically disposed end portion provided with spaced fingers, each of said fingers having a notched portion, and a nose engaging member having a substantially horizontally disposed loop projecting from its surface, said member being movably mounted on said arm with the sides of said loop loosely positioned in the notched portions of said fingers.

OTTO F. NELSON.